(12) United States Patent
Yamakawa

(10) Patent No.: US 8,194,518 B2
(45) Date of Patent: Jun. 5, 2012

(54) OPTICAL DISC DEVICE AND OPTICAL DISC PLAYBACK METHOD

(75) Inventor: Hideyuki Yamakawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/093,745

(22) Filed: Apr. 25, 2011

(65) Prior Publication Data

US 2011/0199880 A1   Aug. 18, 2011

Related U.S. Application Data

(63) Continuation of application No. 12/411,239, filed on Mar. 25, 2009, now abandoned.

(30) Foreign Application Priority Data

May 28, 2008 (JP) ................................ 2008-139548

(51) Int. Cl.
*G11B 7/00* (2006.01)
(52) U.S. Cl. ............... 369/59.23; 369/59.25; 369/59.21; 369/59.15
(58) Field of Classification Search ........................ None
See application file for complete search history.

(56) References Cited

U.S. PATENT DOCUMENTS

| | | | |
|---|---|---|---|
| 6,003,051 A | 12/1999 | Okazaki | |
| 6,493,165 B1 * | 12/2002 | Satoh et al. ...................... | 360/65 |
| 6,563,889 B1 * | 5/2003 | Shih et al. ...................... | 375/341 |
| 6,724,706 B1 | 4/2004 | Nakajima et al. | |
| 7,391,251 B1 * | 6/2008 | Zhang et al. .................. | 327/261 |
| 2004/0071206 A1 | 4/2004 | Takatsu | |
| 2004/0075595 A1 * | 4/2004 | Rapp ............................... | 341/59 |
| 2004/0165510 A1 * | 8/2004 | Nakahira et al. ........... | 369/59.16 |
| 2006/0285468 A1 | 12/2006 | Katsuki | |
| 2007/0286048 A1 | 12/2007 | Hayashi | |
| 2010/0039912 A1 * | 2/2010 | Nakano et al. ............. | 369/53.11 |

FOREIGN PATENT DOCUMENTS

| | | |
|---|---|---|
| EP | 0750306 A2 | 12/1996 |
| EP | 1441344 | 7/2004 |
| JP | 01-220268 | 9/1989 |

(Continued)

OTHER PUBLICATIONS

Office Action for UK Patent Application GB0902838.2, mailed Mar. 27, 2009.
An English Translation of Notification of Reasons for Rejection mailed by Japan Patent Office for Japanese Patent Application No. 2008-139548 on May 26, 2009.

(Continued)

*Primary Examiner* — Van Chow
(74) *Attorney, Agent, or Firm* — Knobbe Martens Olson & Bear, LLP

(57) ABSTRACT

According to one embodiment, a device includes a filter which limits a frequency bandwidth of a reproduced signal from an optical disc, an AD conversion module which converts an output signal from the filter into a multilevel digital signal, an equalizing module for equalizing a waveform of the multilevel digital signal based on a predetermined partial response class and generating an equalizing playback signal, a detection module for generating binary data corresponding to data recorded on the optical disc based on the equalizing playback signal, a module for determining an amplitude value of each of an input signal to and an output signal from the equalizing module with respect to each binary data sequence output from the detection module, and a module for adjusting a high-frequency amplification amount of the filter such that an amplitude value before waveform equalization and an amplitude value after waveform equalization satisfy a predetermined relationship.

8 Claims, 8 Drawing Sheets

FOREIGN PATENT DOCUMENTS

| | | |
|---|---|---|
| JP | H10-055503 | 2/1998 |
| JP | 11-185386 | 7/1999 |
| JP | 2000-105901 | 4/2000 |
| JP | 2000-156047 | 6/2000 |
| JP | 2000-215609 | 8/2000 |
| JP | 2004-342290 | 12/2004 |
| JP | 2005-093933 | 4/2005 |
| JP | 2006-351106 | 12/2006 |

OTHER PUBLICATIONS

Notification of Reasons for Rejection issued by JPO in the corresponding to the Japanese Patent Application No. 2008-139548 mailed on May 26, 2009.

Explanation of Non-English Language Reference(s).

* cited by examiner

F I G. 4 A
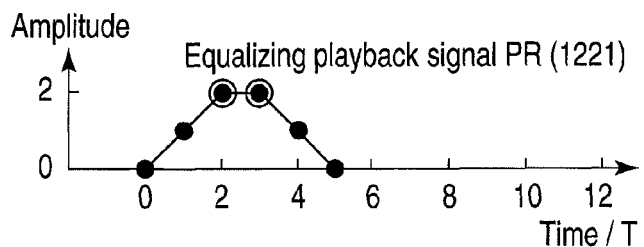
F I G. 4 B
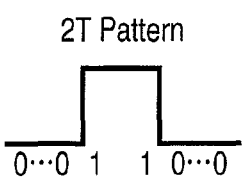
F I G. 4 C
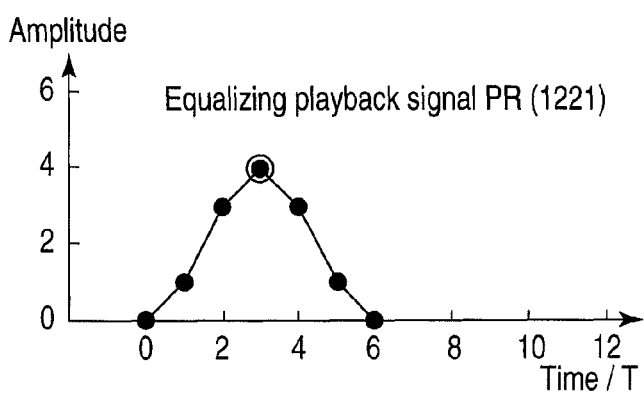
F I G. 4 D
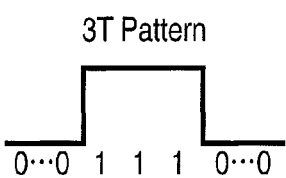
F I G. 4 E
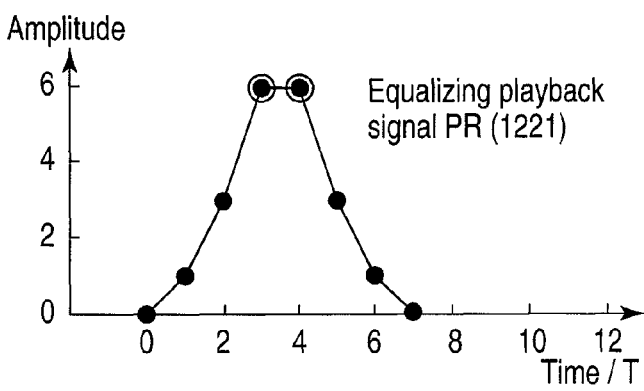
F I G. 4 F
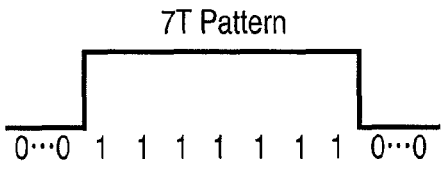
F I G. 4 G
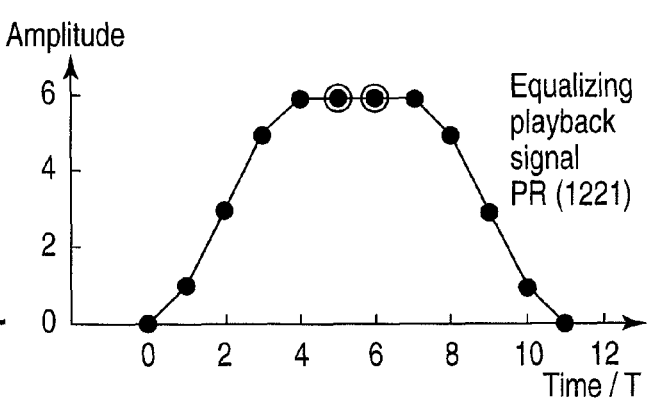
F I G. 4 H

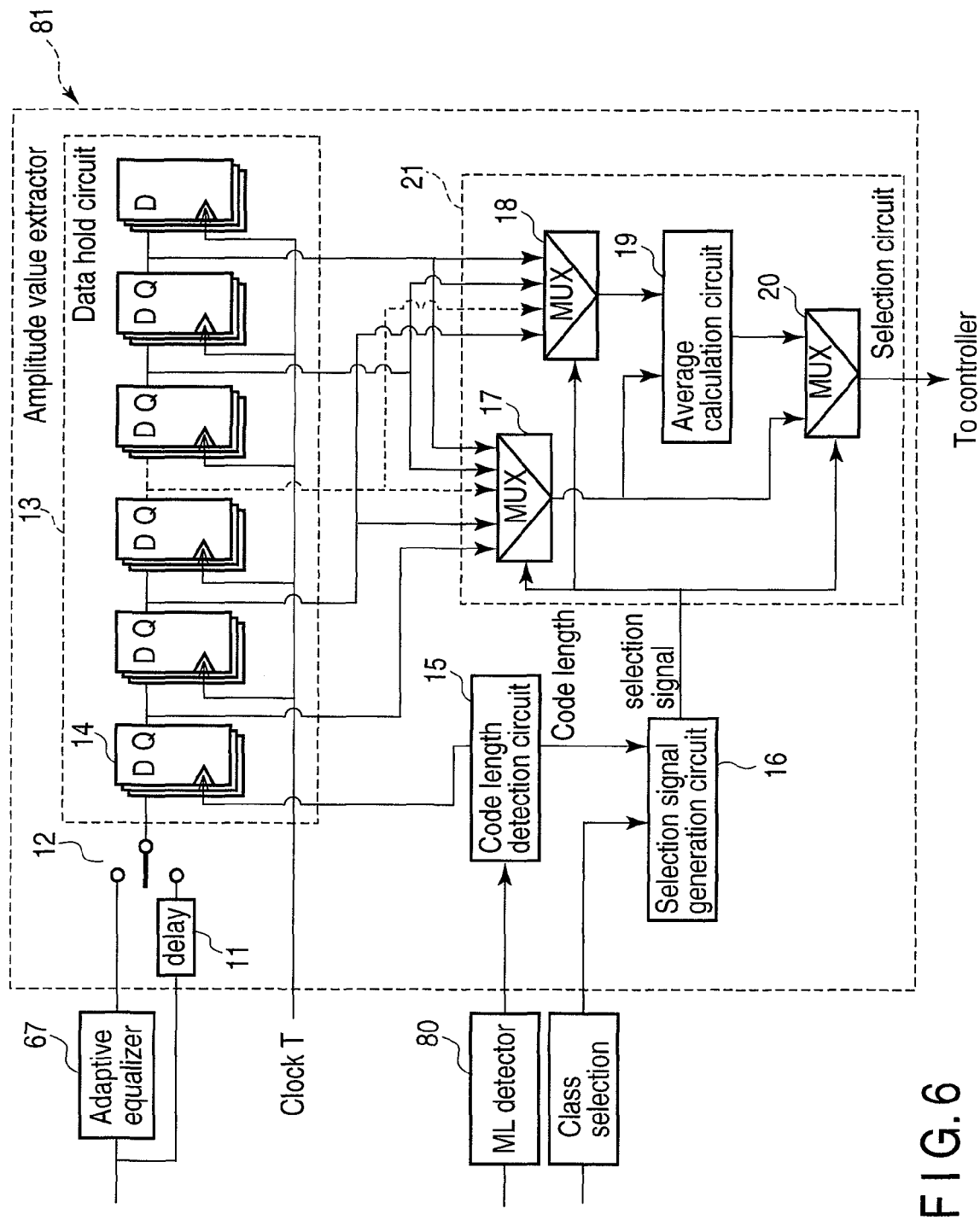
F I G. 6

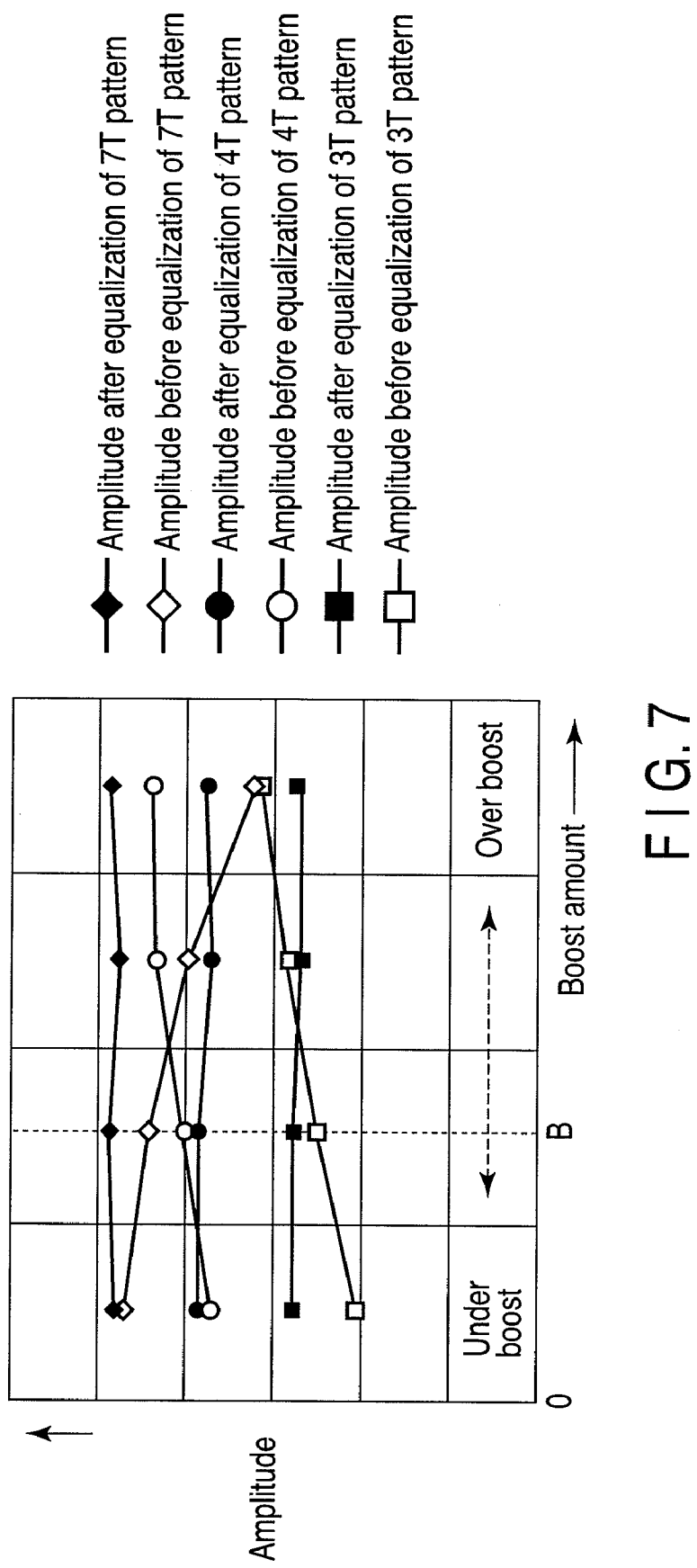
F I G. 7

OPTICAL DISC DEVICE AND OPTICAL DISC PLAYBACK METHOD

CROSS-REFERENCE TO RELATED APPLICATIONS

This application claims the benefit and priority to and is a continuation of U.S. application Ser. No. 12/411,239, filed on Mar. 25, 2009, which claims priority from Japanese Patent Application No. 2008-139548, filed May 28, 2008, the entire contents of which are incorporated herein by reference. The disclosure of these applications is hereby incorporated by reference in their entirety.

BACKGROUND

1. Field

One embodiment of the present invention relates to an optical disc device and an optical disc playback method, and more particularly, to an optical disc drive and an optical disc playback method for decoding recoded data by sampling a playback signal of an optical disc as multilevel data.

2. Description of the Related Art

In the field of optical discs, in particular, high-density optical discs, a playback system called Partial Response Maximum Likelihood (PRML) signal processing system is commonly used. The PRML signal processing system is based on combination of a narrowband response characteristic (PR) tolerating unintentional waveform interference and a maximum likelihood (ML), as disclosed in Jpn. Pat. Appln. KOKAI Publication No. 2005-93933. Noise components are increased according to density increasing of optical discs and the S/N ratio of a playback signal decreases. In spite of such a low S/N ratio, error detection can be greatly decreased by using the PRML signal processing system as compared to the conventional binary data slice system.

In the PRML signal processing system, an analog playback signal is sampled as multilevel data, and amplitude information of the playback signal is aggressively used for data decoding. This makes the PRML signal processing system greatly different from the conventional binary slice system using thresholds.

In a circuit in which an analog filter limiting the bandwidth of an analog playback signal obtained from the optical disc is manufactured by a CMOS process, variation in manufacturing process and change in characteristics due to temperature change are considerably great. Therefore, the transfer characteristics of the overall filter may change greatly even if the analog filter is set with the same cutoff and the same boost amount.

It is therefore desirable to set the cutoff and the boost amount (high-frequency amplification amount) in consideration of variation in manufacturing process of the analog filter and change characteristics due to temperature change. An analog filter has previously been adjusted utilizing spectrum analysis based on a band pass filter, for example (see Jpn. Pat. Appln. KOKAI Publication No. 1-220268).

In the above-described method in which an analog filter is adjusted utilizing a band bass filter, adjustment accuracy is low, and such a method is difficult for application to a playback device which reproduces a high-density optical disc. Further, when a separate circuit for preventing variation in characteristics is provided in an analog filter itself, the manufacturing cost may increase.

The present invention has been made in consideration of the above-described circumstances, and is capable of providing an optical disc device and an optical disc playback method with reduced costs and an improved reading rate.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4A shows a unit pulse of code length 1T.

FIG. 4B shows an example of an equalizing playback signal of PR (1221) class corresponding to the unit pulse shown in FIG. 4A.

FIG. 4C shows a unit pulse of code length 2T.

FIG. 4D shows an example of an equalizing playback signal of PR (1221) class corresponding to the unit pulse shown in FIG. 4C.

FIG. 4E shows a unit pulse of code length 3T.

FIG. 4F shows an example of an equalizing playback signal of PR (1221) class corresponding to a unit pulse shown in FIG. 4E.

FIG. 4G shows a unit pulse of code length 7T.

FIG. 4H shows an example of an equalizing playback signal of PR (1221) class corresponding to the unit pulse shown in FIG. 4G.

FIG. 6 is a block diagram schematically showing a configuration example of an amplitude value extractor of the optical disc drive shown in FIG. 1.

FIG. 7 illustrates the relationship of amplitude values of a playback signal before and after equalization in the optical disc according to an embodiment of the present invention.

DETAILED DESCRIPTION

Various embodiments according to the invention will be described hereinafter with reference to the accompanying drawings. In general, according to one embodiment of the invention, an optical disc device which plays back an optical disc on which data is recorded by PRML system, comprises an analog filter which limits a frequency bandwidth of a playback signal obtained from the optical disc, an AD conversion means for converting an output signal from the analog filter into a multilevel digital signal, an adaptive equalizing means for equalizing a waveform of the multilevel digital signal based on a predetermined partial response class and generating an equalizing playback signal, a maximum likelihood detection means for generating binary data corresponding to data recorded on the optical disc based on the equalizing playback signal, an amplitude value extraction means for obtaining an amplitude value of each of an input signal to and an output signal from the adaptive equalizing means with respect to each binary data sequence (code length) output from the maximum likelihood detection means, and an adjusting means for adjusting a high-frequency amplification amount of the analog filter such that the amplitude value of the input signal to the adaptive equalizing means of said each binary data sequence (code length) and the amplitude value of the output signal from the adaptive equalizing means of said each binary data sequence (code length) satisfy a predetermined relationship.

Figure 1:
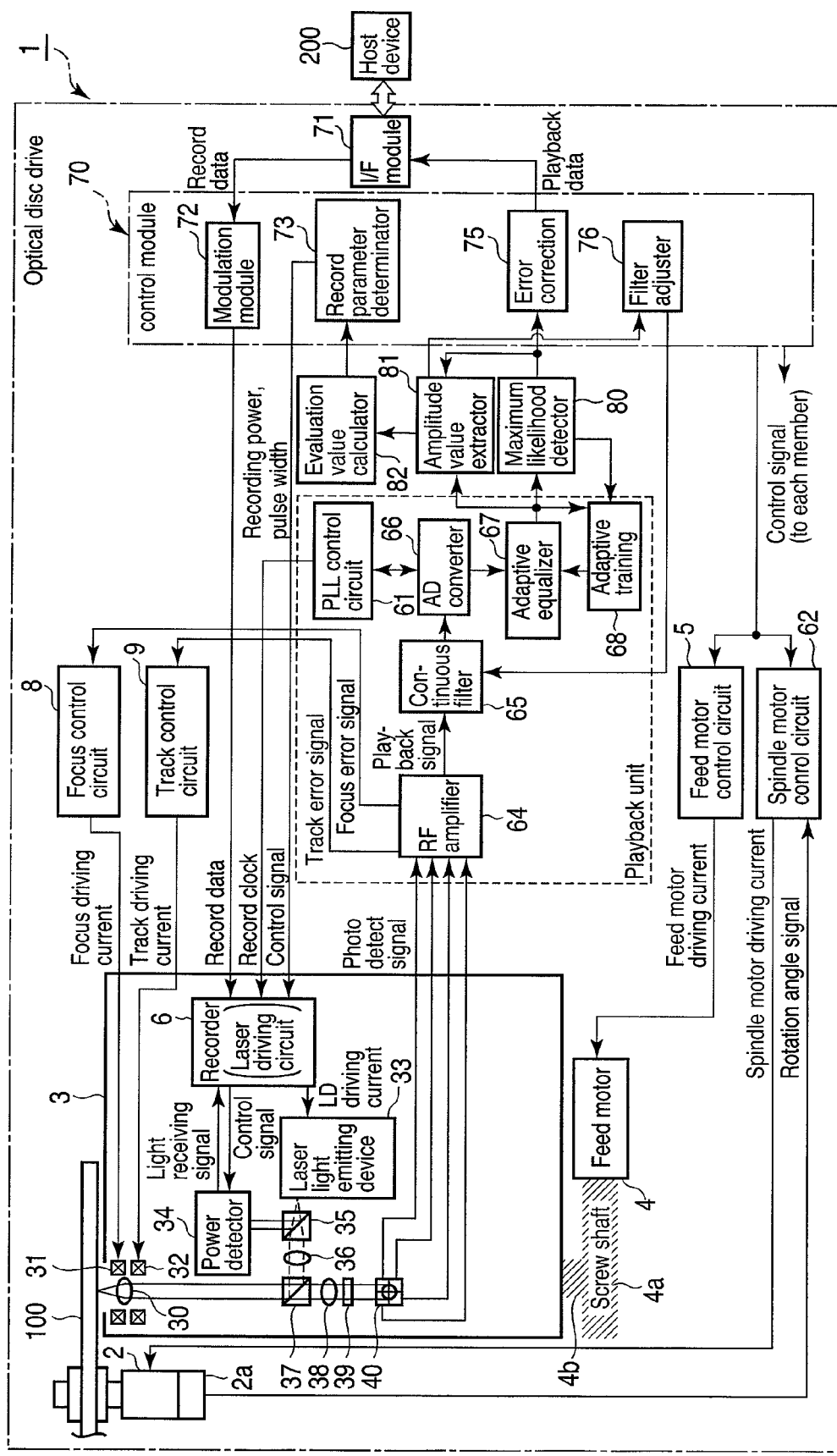
FIG. 1 is a block diagram schematically showing a configuration example of an optical disc drive according to an embodiment of the present invention.

Hereinafter, an embodiment of an optical disc device and an optical disc playback method will now be described with reference to the accompanying drawings. As shown in FIG. 1, an optical disc device 1 according to an embodiment of the present invention records and plays back information on an optical disc 100. FIG. 1 illustrates an optical disc medium capable of recording and playback, but the present invention is similarly applicable to a playback-only optical disc medium.

The optical disc 100 has a ditch arranged in a concentric or spiral pattern. A concave portion of the ditch is called a land, a convex portion of the ditch is called a groove, and a circuit of the groove and the land is called a track. User data is recorded by forming marks and spaces corresponding to a code length of the data by applying intensity-modulated laser light along the track (only the grooves or both the grooves and the lands). Data is played back by applying laser light along the track with a read power weaker than the power for recording and detecting change in intensity of a reflective light based on recorded marks along the track. Recorded data is erased by applying laser light along the track with an erase power stronger than the read power and crystallizing a recording layer.

The optical disc 100 is rotary-driven by a spindle motor 2. A rotary angle signal is supplied from a rotary encoder 2a provided in the spindle motor 2. The rotary angle signal generates five pulses, for example, when the spindle motor 2 makes one rotation. Based on the rotation angle signal, the rotation angle and the number of rotations of the spindle motor 2 can be determined. Based on the information, a spindle motor control module 62 performs a rotation drive control of the spindle motor 2.

Information recording and playback on the optical disc 100 is performed by an optical pickup 3. The optical pickup 3 is coupled to a feed motor 4 via a gear 4b and a screw shaft 4a, and the feed motor 4 is controlled by a feed motor control module 5. The feed motor 4 is rotated by a feed motor driving current from the feed motor control module 5, and thereby the optical pickup 3 is moved toward a radius direction of the optical disc 100. The optical pickup 3 is provided with an objective lens supported by a wire, not shown, or a plate screw. The objective lens 30 is movable in a focusing direction (optical axis direction of the lens) by driving a driving coil 31. Further, the objective lens 30 is movable in a tracking direction (direction crossing the optical axis of the lens) by driving the driving coil 32.

The laser driving circuit (recorder) 6 supplies a driving current for writing to a laser diode (laser light emitting device) 33 based on recorded data modulated with an Eight to Twelve Modulation (ETM) system, for example, by a modulation module 72. Data for recording is supplied to the modulation module 72 from a host device 200 of a personal computer, for example, via an I/F module 71.

In information reading, on the other hand, the laser driving circuit 6 supplies a driving current for reading which is smaller than the driving current for writing to the laser diode 33.

A power detection module 34 (also referred to as a front monitor (FM)) formed of a photodiode, for example, causes a part of the laser light generated by the laser light emitting device 33 to diverge by a predetermine ratio by means of a half mirror 35, and detects a signal proportional to the light amount, i.e., the light emitting power as a light receiving signal. The detected light receiving signal is supplied to the laser driving circuit 6.

The laser driving circuit 6 controls the laser light emitting device 33 based on the light receiving signal from the power detector 34 such that the laser light emits with a recording power, recording pulse width, a playback power, and an erasure power determined and set by a recording parameter determinator 73, for example, of the control module 70.

The laser light emitting device 33 generates laser light according to a driving current supplied from a laser driving circuit 6. The laser light emitted from the laser light emitting device 33 is applied to the optical disc 100 via the objective lens 30.

The reflective light from the optical disc 100, on the other hand, is led to a light detector 40 via the objective lens 30, the half prism 37, a light focus lens 38, and a cylindrical lens 39.

The light detector 40 is formed of light detection cells divided into four parts, and a detection signal of each of the light detection cells is output to an RF amplifier 64 of a playback module 60. The RF amplifier 64 processes the signal from the light detection cell and generates a focus error signal FE indicating an error from the just-focus position, a tracking error signal TE indicating an error between a beam spot center of laser light and a track center, and a playback signal which is a full adder signal of the light detection cell signals. The focus error signal FE is supplied to the focus control module 8. The focus control module 8 generates a focus driving signal in response to the focus error signal FE. The focus driving signal is supplied to a driving coil 31 in a focusing direction. Thereby, focus servo control in which laser light is always in the just-focus position on the recording film of the optical disc 100.

On the other hand, the tracking error signal TE is supplied to a track control module 9. The track control module 9 generates a track driving signal in response to a tracking error signal TE. A track driving signal output from the track control module 9 is supplied to a driving coil 32 in a tracking direction. Thereby, tracking servo control in which laser light always traces a track formed on the optical disc 100 is performed.

By performing the focus servo control and the tracking servo control, the focus of the laser light can accurately follow the track of the optical disc recording surface. As a result, the full adder signal RF of the output signals of each of the light detection cells of the light detector 40 correctly reflects change of reflective light from marks and spaces formed on the track of the optical disc 100 corresponding to the recorded information, and thereby a high-quality playback signal can be obtained.

The playback signal (full adder signal RF) is input to the continuous filter 65. The playback signal from the optical disc 100 is subjected to an appropriate bandwidth restriction by the continuous filter 65 and amplified to an appropriate amplitude and subjected to an analog waveform shaping.

The continuous filter 65 can change its transfer characteristics by control of the controller 70. That is, the continuous filter 65 is a continuous filter with variable transfer characteristics, and is an analog filter formed of analog circuits. The transfer characteristics of the continuous filter 65 include various patterns, but can be expressed as an example in the following formula:

$$H(s) = \left( \frac{-k \cdot s^2 + \omega_1^2}{s^2 + \omega_1/Q_1 s + \omega_1^2} \right) \left( \frac{\omega_2^2}{s^2 + \omega_2/Q_2 s + \omega_2^2} \right) \left( \frac{\omega_3^2}{s^2 + \omega_3/Q_3 s + \omega_3^2} \right) \left( \frac{\omega_4}{s + \omega_4} \right) \quad (1)$$

In the above-described formula (I), the variable k is a value (i.e., high-frequency amplification amount; hereinafter referred to as boost amount) indicating the amount of amplification of a high-frequency component in transfer characteristics. The values of the variables $\omega_1$, $\omega_2$, $\omega_3$, $\omega_4$ (hereinafter referred to as cutoffs) are set according to a cutoff frequency $\omega c$ of the continuous filter 65.

The constants Q1, Q2, Q3 are set to be predetermined values. In usual, the boost amount is adjusted according to the density of data recorded on the optical disc 100, and the cutoffs are adjusted according to the rotation speed (playback speed) of the optical disc 100.

An output signal from the continuous filter 65 is sampled by a playback clock signal from a PLL circuit 61 at an AD converter 66, and converted to multilevel digital data. The digitized playback signal is input to an adaptive equalizer (waveform equalizer) 67, and subjected to a waveform equalization according to a kind (class) of a predetermined partial response.

An equalizing playback signal, which is an output signal from the adaptive equalizer 67, is input to a maximum likelihood detector 80. The equalizing playback signal subjected to waveform equalization is played back as binary data formed of '1' and '0' by the maximum likelihood detector 80.

An adaptive training block 68 adjusts equalization characteristics, for example, such that the output signal from the adaptive equalizer 67 becomes a predetermined class of partial response based on the output signal from the adaptive equalizer 67 and the output signal from the maximum likelihood detector 80.

Therefore, when the adaptive training block 68 is normally operated, the output signal from the adaptive equalizer 67 becomes a predetermined class of partial response waveform.

The output signal from the maximum likelihood detector 80 is input to an error correction 75 and an amplitude value extractor 81.

The error correction 75 is output to the host device 200 via the I/F module 71 after an error correction processing.

On the other hand, an equalizing playback signal, which is an output signal from the adaptive equalizer 67, and binary data, which is an output signal from the maximum likelihood detector 80, are input to the amplitude value extractor 81, and an amplitude value (a peak value and a bottom value) of each binary data sequence (code length) is extracted from the equalizing playback signal. The detailed configuration example and operation of the amplitude value extractor 81 will be described later.

The amplitude value extracted by the amplitude value extractor 81 is input to the evaluation value calculator 82 and a filter adjuster 76. The evaluation value calculator 82 calculates an evaluation value for determining an optimum recording parameter such as an optimum recording power and an optimum recording pulse width based on the supplied amplitude value. An example of the evaluation value is an asymmetry value of each code length.

Figure 2:
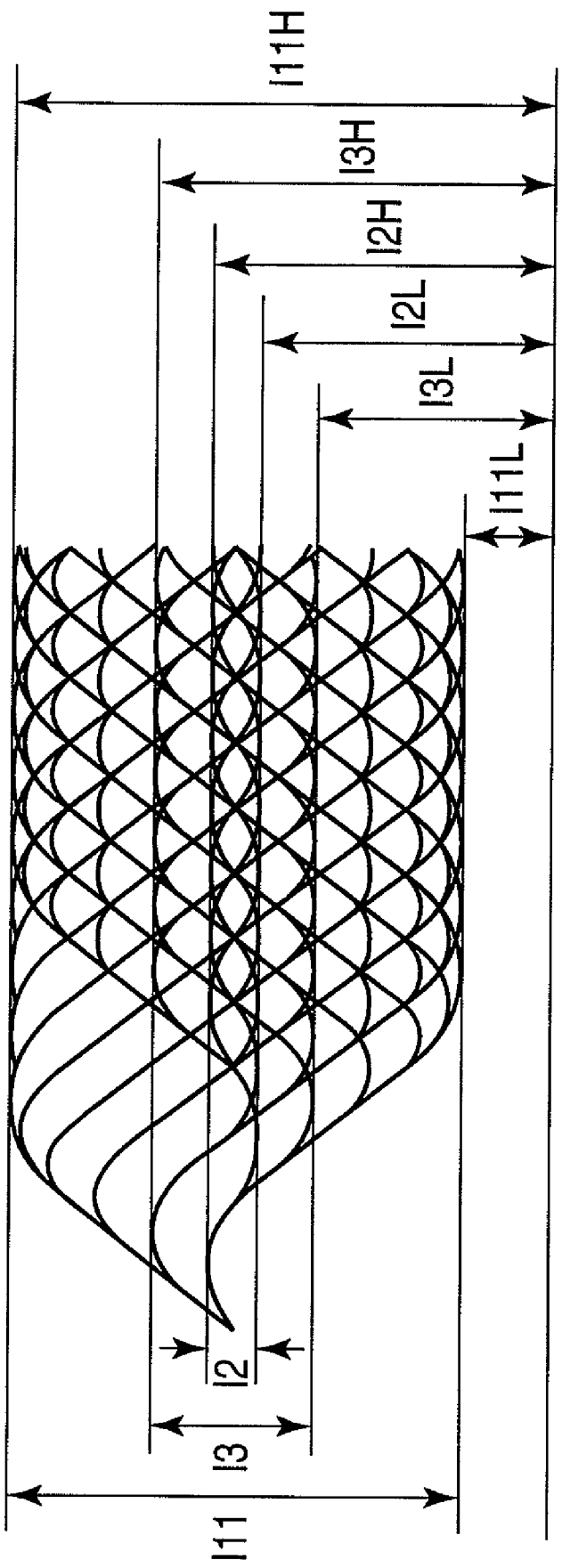
FIG. 2 shows an example of an asymmetry value of each code length.

FIG. 2 illustrates the concept of asymmetry. A code length records user data by means of marks and spaces of lengths ranging from 2T to 11T (where T denotes the unit length of the code length), and playback signals from the code lengths are superimposed on one another in FIG. 2.

In FIG. 2, I11H and I11L denote amplitude values of the marks and spaces of the code length I11T, I3H and I3L denote amplitude values of the marks and spaces of the code length 3T, and I2H and I2L denote amplitude values of the marks and spaces of the code length 2T. In this case, the asymmetry value AnT of the code length nT can be expressed by the following formula:

$$AnT=((I11H+I11L)/2-(InH+InL)/2)/(I11H-I11L)$$

As clear from the formula, the asymmetry value of the code length nT is an indicator of the degree of coincidence between the central value of the marks and spaces of the maximum code length 11T and the central value of the marks and spaces of each code length nT. In an ideal playback signal waveform in which a perfect vertical symmetry is secured, all the asymmetry values of the code lengths become zero.

In reality, the asymmetry value never becomes zero due to variation in characteristics of the optical disc itself or the optical disc device recording and playing back information thereon. In order to reduce the asymmetry value close to zero, the evaluation value calculator 82 calculates an evaluation value for determining an optimum recording parameter such as an optimum recording power and an optimum recording pulse width based on the supplied amplitude value, and adjusts the recording parameter such as a recording power and a recording pulse width. Such a processing is called OPC (Optimum Power Control).

FIGS. 3-5 show the principle of operation of the amplitude value extractor 81 according to the present embodiment.

FIGS. 3A-3H correspond to the class (kind) of the partial response called PR (12221). FIGS. 3A, 3C, 3E and 3G illustrate recorded data of different code lengths, and FIGS. 3B, 3D, 3F and 3H illustrate waveforms (partial response waveforms) of corresponding ideal equalizing playback signals.

Figure 3A:
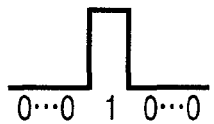
FIG. 3A shows a unit pulse of code length 1T.
Figure 3B:
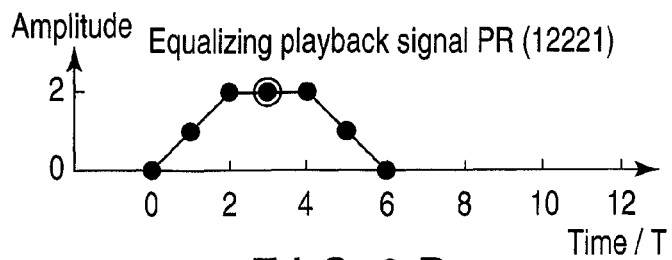
FIG. 3B shows an example of an equalizing playback signal of PR (12221) class corresponding to the unit pulse shown in FIG. 3A.

For example, FIG. 3A illustrates a unit pulse of the code length 1T, and FIG. 3B illustrates an equalizing playback signal corresponding to the unit pulse. The partial response is a response tolerating in-code interference, and is scattered over five points except for zero-amplitude points with respect to the code length 1T, as clear from FIG. 3B.

The numbers in the parenthesis PR(12221) denote the amplitude series of the response signal corresponding to the unit pulse. According to the class of the partial response, the length (hereinafter referred to as response length) of the response corresponding to the unit pulse is determined. For example, the response length of PR (12221) is 5.

Figure 3C:
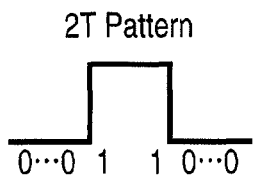
FIG. 3C shows a unit pulse of code length 2T.
Figure 3D:
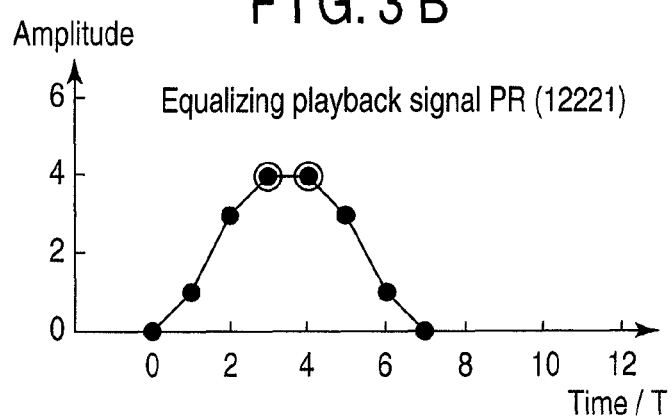
FIG. 3D shows an example of an equalizing playback signal of PR (12221) class corresponding to the unit pulse shown in FIG. 3C.
Figure 3E:
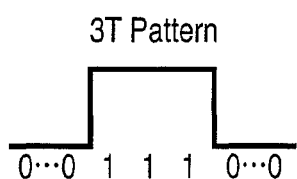
FIG. 3E shows a unit pulse of code length 3T.
Figure 3F:
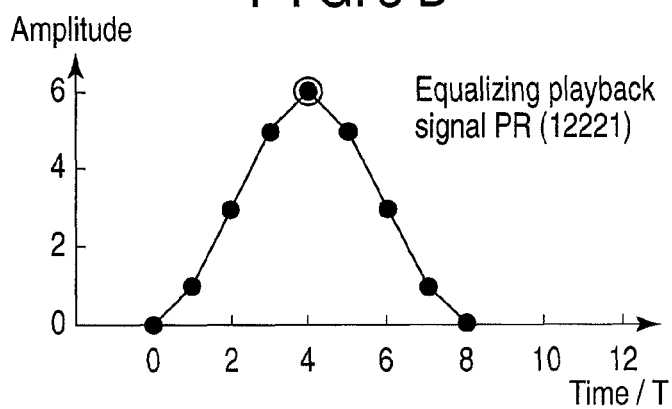
FIG. 3F shows an example of an equalizing playback signal of PR (12221) class corresponding to the unit pulse shown in FIG. 3E.
Figure 3G:
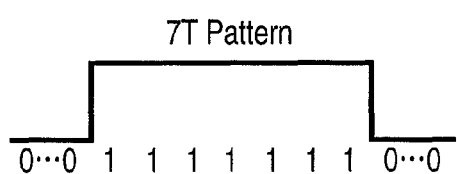
FIG. 3G shows a unit pulse of code length 7T.
Figure 3H:
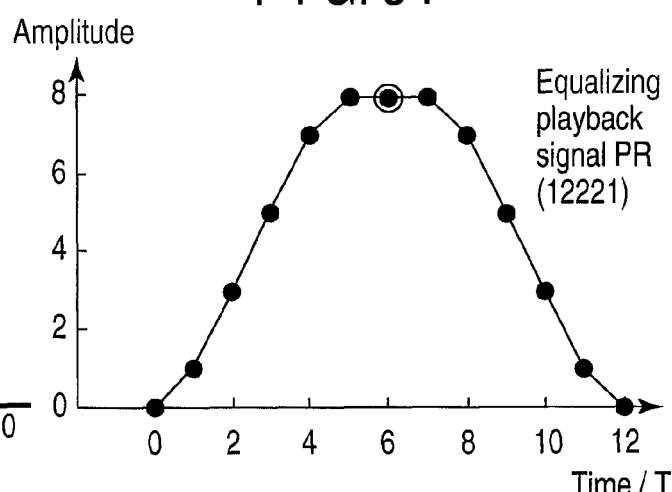
FIG. 3H shows an example of an equalizing playback signal of PR (12221) class corresponding to the unit pulse shown in FIG. 3G.
Figure 5A:
FIG. 5A shows a unit pulse of code length 1T.
Figure 5B:
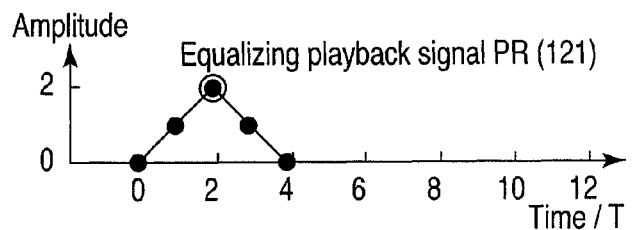
FIG. 5B shows an example of an equalizing playback signal of PR (121) class corresponding to the unit pulse shown in FIG. 5A.
Figure 5C:
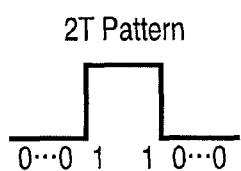
FIG. 5C shows a unit pulse of code length 2T.
Figure 5D:
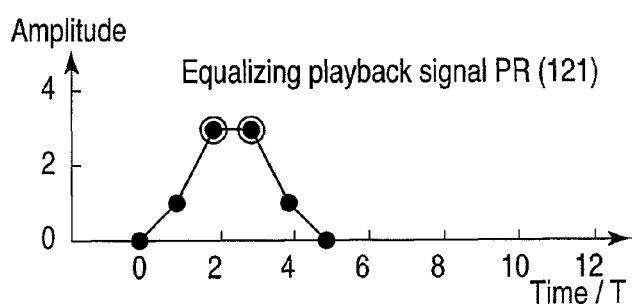
FIG. 5D shows an example of an equalizing playback signal of PR (121) class corresponding to the unit pulse shown in FIG. 5C.
Figure 5E:
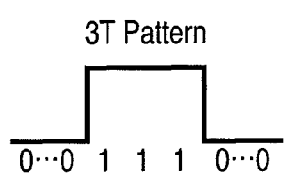
FIG. 5E shows a unit pulse of code length 3T.
Figure 5F:
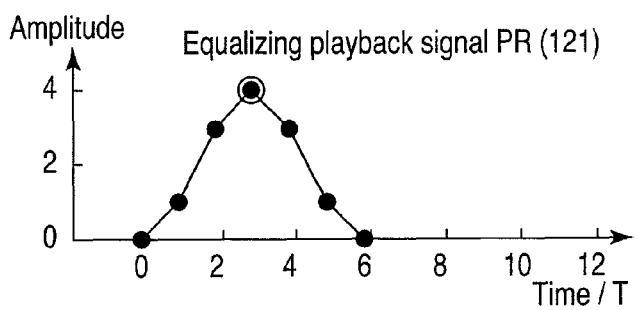
FIG. 5F shows an example of an equalizing playback signal of PR (121) class corresponding to the unit pulse shown in FIG. 5E.
Figure 5G:
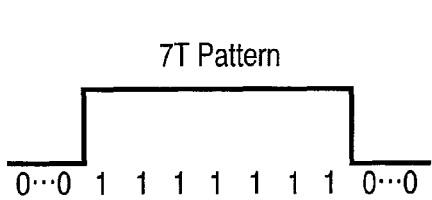
FIG. 5G shows a unit pulse of code length 7T.
Figure 5H:
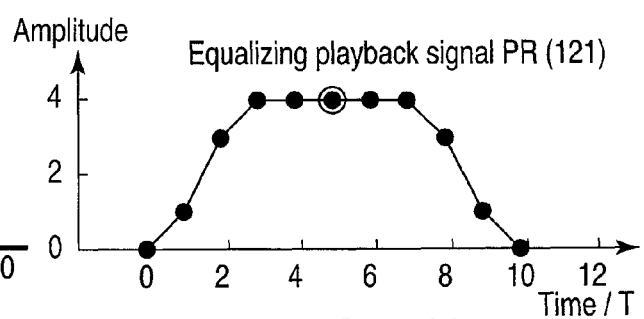
FIG. 5H shows an example of an equalizing playback signal of PR (121) class corresponding to the unit pulse shown in FIG. 5G.

FIG. 3C illustrates record data with code length 2T, and FIG. 3D illustrates an ideal equalizing playback signal thereof. Similarly, FIG. 3E illustrates record data with code length 3T, FIG. 3F illustrates an ideal equalizing playback signal thereof, FIG. 3F illustrates record data with code length 7T, and FIG. 3H illustrates an ideal equalizing playback signal thereof.

As clear from FIGS. 3A-3H, an amplitude value can be extracted from an equalizing playback signal by extracting the central amplitude value of the record data of each code length. The record data can be obtained as binary data (decoded data) from the maximum likelihood detector 80. That is, the amplitude value of each code length can be obtained by detecting the code length from the binary data and specifying the central position thereof.

The white and black circles in FIGS. 3A-3H denote sample points at which analog-digital conversion is performed. That is, in the optical disc drive according to the present embodiment, the amplitude value of each code length can be determined by determining the amplitude value of the central black circle of each record pattern.

More specifically, the amplitude value can be obtained by detecting the switching points (edges) between "0" and "1" of binary data, making the center between the edges the center of each code length, and extracting the amplitude value of the equalizing playback signal of the sampling point.

Depending on combination of the record patterns and the class of the partial response, there are cases where there is only one central point and there are two central points. For example, in the case of PR (12221) class, there is only one central sampling point when the code length is an odd number, and there are two central sampling points when the code length is an even number. Therefore, in the optical disc device according to the present embodiment, when there is only one sampling point, the amplitude value is used as it is, and when there are two sampling points, the average value of the two points is set as the amplitude value.

The above-described relationship can be known in advance from the predetermined class of the partial response and the record patterns. Further, the record patterns can be obtained as binary data sequence from the maximum likelihood detector 80.

That is, the recorded pattern is specified from the detected binary data sequence, and the amplitude value of the central position corresponding to the recorded patterns is specified. Then, in order to eliminate the effect of noise included in the playback signal, the amplitude value of the central position of the same record pattern is obtained a plurality of times, and the average value thereof is calculated. Thereby, the amplitude value of each record pattern can be obtained.

Whether there is only one central sampling point or there are two central sampling points depends on the class of the partial response, more specifically, whether the response length of the partial response is an even or odd number, as well as whether the code length is an odd or even number.

FIGS. 3A-3H illustrate equalizing playback signals of PR (12221) class having a response length of the odd number "5", whereas FIGS. 4A-4H illustrate equalizing playback signals of PR (1221) class having a response length of the even number "4". As clear from FIGS. 4A-4H, in the case of PR (1221) class, there are two central sampling points when the code length is an odd number (see FIGS. 4B, 4F and 4H), and there is only one central sampling point when the code length is an even number (see FIG. 4D).

FIGS. 5A-5H illustrate equalizing playback signals of PR (121) class having the response length of the odd number "3". As clear from FIGS. 5A-5H, in PR (121) class, there is only one central sampling point when the code length is an odd number (see FIGS. 5B, 5F and 5H), and there are two central sampling points when the code length is an even number (see FIG. 5D).

As clear from the above illustrations, when the response length of the partial response is an odd number (as in the case of PR (12221) class or PR (121) class), when the code length is an odd number, there is only one central sampling point, and when the code length is an even number, there are two central sampling points.

On the other hand, when the response length of the partial response is an even number (as in the case of PR (1221) class), there is a rule that there are two central sampling points when the code length is an odd number, and there is only one central sampling point when the code length is an even number.

In the present embodiment, the above-described rule is used to determine whether the central value of an equalizing playback signal having one central point in the code length should be used as an amplitude value, or the average value of two central points of an equalizing playback signal having the two central points should be used as an amplitude value, and operations are switched based on the determination.

The above-described process of extracting an amplitude value based on the operation principle can be realized in software as well, but can be more favorably realized with the configuration of hardware from the view point of processing speed.

The amplitude value extractor 81 determines an average value of a signal amplitude of each recorded data pattern using binary data sequence output from the maximum likelihood detector 80 and an input signal (before equalization) to or an output signal (after equalization) from the adaptive equalizer 67 as input signals.

FIG. 6 is a block diagram showing the amplitude value extractor 81 with respect to each of the above-described record patterns. The pattern-by-pattern amplitude value extractor 81 is formed of a data hold circuit 13 comprising a plurality of flip-flops 14, a delay circuit 11, a switch circuit 12, a code length detection circuit 15, a selection signal generation circuit 16, and a selection circuit 21. Further, the selection circuit 21 is formed of three multiplexers 17, 18 and 20, and an average value calculation circuit 19.

The input signal to the amplitude value extractor is selected from one of the input signal to the adaptive equalizer 67 or the output signal from the adaptive equalizer 67. The delay circuit 11 is provided to adjust delay time between the input signal to the adaptive equalizer 67 and the output signal from the adaptive equalizer 67.

The data hold circuit 13 holds an input signal or an output signal from the adaptive equalizer 67 by sequentially delaying the signal on a clock of basic unit T of the code length. The number of stages of delay of the data hold circuit 13 should be the same as the number of the maximum code length.

The code length detection circuit 15 detects switching points (edges) of binary data output from the maximum likelihood detector 80, i.e., the point at which data changes from '0' to '1' and the point at which data changes from '1' and '0' and detects the length of the binary data. The selection signal generation circuit 16 generates a selection signal used for three multiplexers 17, 18 and 20 based on the kind of the class of the partial response, which will be set separately, and the detected code length.

Upon determining that there is only one central sampling point based on the code length and the response length of the class of the partial response, the selection signal generation circuit 16 outputs the signal which selects the one point to the multiplexer 17. The selection signal generation circuit 16 outputs a selection signal which selects output from the multiplexer 17 to the multiplexer 20. As a result, the amplitude value of the one central point of the code length is output.

On the other hand, determining that the central sampling points spread over two points based on the code length and the code length of the partial response class, the selection signal generation circuit 16 outputs a selection signal which selects one of the sampling points to the multiplexer 17 and outputs a selection signal which selects the other sampling point to the multiplexer 18.

As a result, the average value calculation circuit 19 calculates the average value of the two sampling points. Further, the average value calculation circuit 19 outputs a selection signal which selects output from the average value calculation circuit 19 to the multiplexer 20. As a result, the average of the signal amplitude value having the two central points in the code length is output.

When the continuous filter 65 is a circuit manufactured in a CMOS process, the transfer characteristics of the overall filter change greatly even with the same cutoff and the same boost amount, due to variation in manufacturing process and enormous change in characteristics depending on temperature change.

Therefore, in the optical disc device according to the present embodiment, the boost amount is adjusted using the amplitude value generated as described above. The controller 70 has a filter adjuster 76 which adjusts transfer characteristics of the continuous filter 65 based on an output signal from the amplitude value extractor 81.

FIG. 7 shows an example of the relationship between the boost amount of the continuous filter 65 and the amplitude value of each pattern output from the amplitude value extractor 81. In FIG. 7, the horizontal axis denotes the boost amount of the continuous filter, and the vertical axis denotes a signal amplitude. For example, the amplitude value before equalization and the amplitude value after equalization of each of 3T pattern, 4T pattern, and 7T pattern in PR (1221) class are shown.

As shown in FIG. 7, the relationship of amplitude values of playback signals before and after equalization change according to the boost amount of the continuous filter 65. It has been confirmed that the relationship of amplitude values of the playback signals before and after the equalization does not greatly change according to the cutoff of the continuous filter.

That is, the optimum boost amount can be set without being affected by variation in characteristics of the continuous filter 65 formed of an analog circuit by adjusting the boost amount such that the relationship of amplitude values between before and after equalization in an arbitrary pattern becomes optimum.

Assume that the filter adjuster 76 obtains an optimum characteristic when the boost amount becomes value B shown in FIG. 7, for example. The filter adjuster 76 adjusts transfer characteristics of the continuous filter 65 such that the ratio of amplitude values between before and after equalization becomes the relationship shown by dotted line B in FIG. 7. In adjusting transfer characteristics of the continuous filter 65, only one pattern such as 3T pattern may be focused on, but by focusing on two or more patterns such as 3T and 7T patterns, the transfer characteristics of the continuous filter 65 can be adjusted more accurately.

Figure 8:
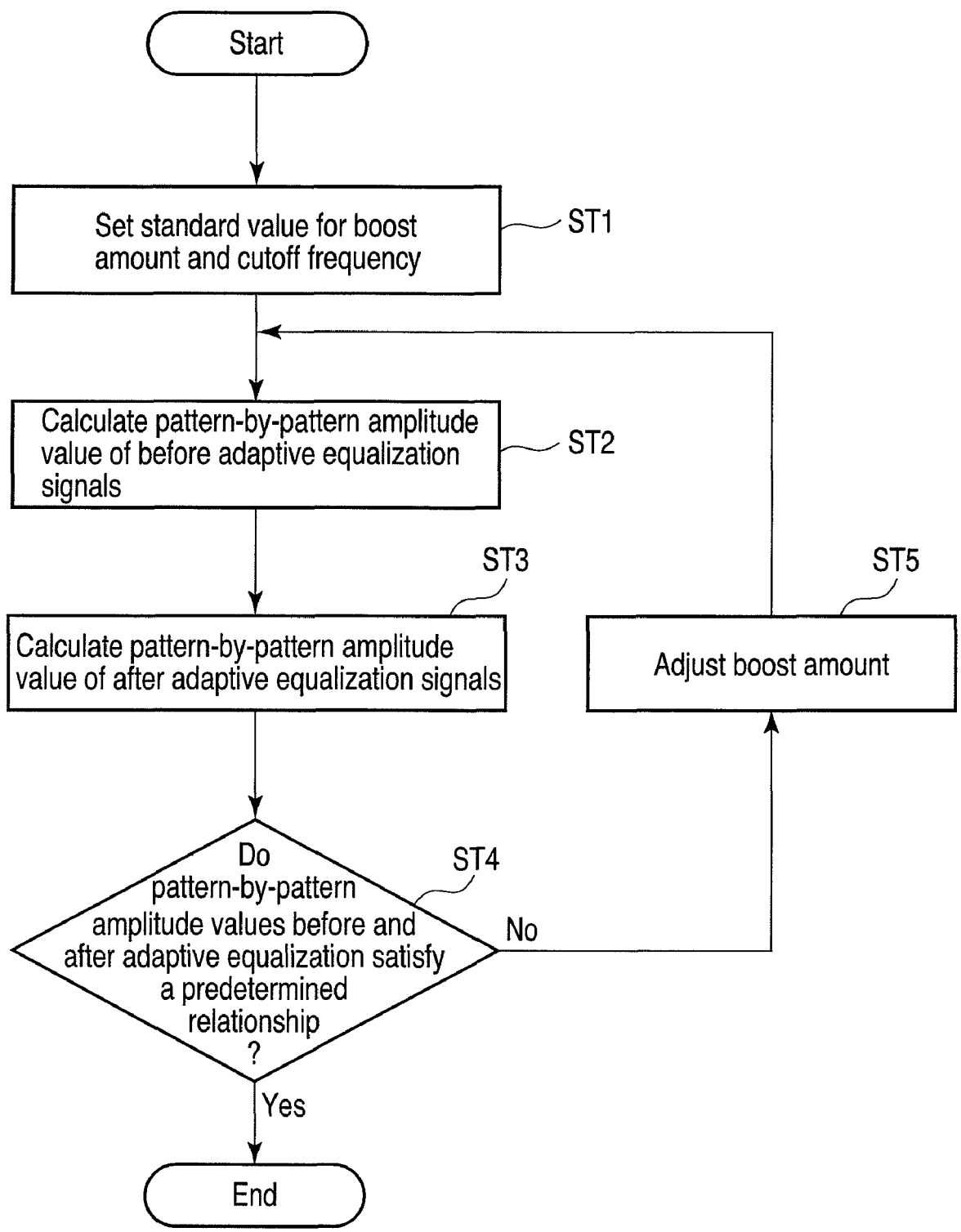
FIG. 8 is a flowchart illustrating an example of an optical disc playback method according to an embodiment of the present invention.

In summary, the present invention adjusts transfer characteristics of the continuous filter 65 according to the procedure (flowchart) shown in FIG. 8. That is, standard transfer characteristics determined by recording density and playback speed are set in the continuous filter 65 (block ST1). Signals on the optical disc 100 are played back to determine pattern-by-pattern amplitude values before adaptive equalization (block ST2). The signals on the optical disc 100 are played back again to determine pattern-by-pattern amplitude values after adaptive equalization (block ST3).

In order to extract an amplitude value of a playback signal before adaptive equalization or a playback signal after adaptive equalization, the amplitude value extractor 81 causes the data hold circuit 13 to delay and hold the playback signal on a clock with a unit length of the code length of a playback signal before or after adaptive equalization, and causes the code length detection circuit 15 to detect a data change point of binary data output from the maximum likelihood detector 80 to detect the code length of the playback signal before or after adaptive equalization.

Then, the amplitude value extractor 81 causes the selection signal generation circuit 16 to determine a response length of a partial response from the kind (class) of the partial response, and to generate a selection signal based on the determined response length and the code length detected by the code length detection circuit 15.

The selection circuit 21 selects an amplitude value of an equalizing playback signal of a sampling point corresponding to the center of the detected code length from the data hold circuit 13 based on the selection signal generated by the selection signal generation circuit 16.

When there are two sampling points, the selection circuit 21 takes an average of two amplitude values of corresponding output signals from the adaptive equalizer 67 or two amplitude values from the delay circuit 11 and outputs the average value as an amplitude value.

After determining whether the obtained amplitude values before and after adaptive equalization satisfy a predetermined relationship (block ST4), when the amplitude values before and after adaptive equalization satisfy the predetermined relationship, the adjustment is finished.

When the amplitude values before and after adaptive equalization in a specific pattern do not satisfy the predetermined relationship, the boost amount of the continuous filter 65 is adjusted (block ST5), the signals on the optical disc 100 are played back again, and pattern-by-pattern amplitude values before adaptive equalization are obtained (block ST2). In this block, the cutoff frequency of the continuous filter 65 may be adjusted. The blocks ST2 to ST5 are repeated until the amplitude values before and after adaptive equalization of a specific pattern satisfy a predetermined relationship. Following the above-described procedure, the transfer characteristics of the continuous filter 65 can be adjusted to an optimum state.

In the above-described optical disc playback method, pattern-by-pattern amplitude values are extracted by focusing on two or more patterns, but the transfer characteristics of the continuous filter 65 can be adjusted to an optimum state even when the boost amount is adjusted by focusing on an only one pattern.

As described above, according to an optical disk device and an optical disc playback method of the present embodiment, the transfer characteristics of the continuous filter can be adjusted by adjusting pattern-by-pattern amplitude values before and after adaptive equalization in a predetermined relationship.

By thus adjusting the transfer characteristics, even with a CMOS process exhibiting a wide range of manufacturing variation, for example, the optimum transfer characteristics can be obtained, and thereby the reading rate is greatly improved.

Further, by adjusting the transfer characteristics of the continuous filter 65 by focusing on two or more patterns, the transfer characteristics of the continuous filter 65 can be adjusted more accurately.

Moreover, since the amplitude values of playback signals used for calculation of evaluation values for determining an optimum recording parameter such as an optimum recording power and an optimum recording pulse width are utilized to adjust the transfer characteristics of the continuous filter 65, the necessity to separately install an expensive circuit to prevent variation in characteristics of the continuous filter 65 is eliminated, and thereby the manufacturing cost can be reduced.

That is, according to the optical disc device and the optical disc playback method of the present embodiment, the costs can be reduced due to the unnecessity of a circuit to prevent variation in characteristics of an analog filter, and the capability of high-accurate adjustment of an analog filter provides the optical disc device and the optical playback method with an improved reading rate.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The various modules of the systems described herein can be implemented as software applications, hardware and/or software modules, or components on one more computers, such as servers. While the various modules are illustrated separately, they may share some or all of the same underlying logic or code.

What is claimed is:

1. An optical disc device configured to play back an optical disc, comprising:
    an analog filter configured to limit a frequency bandwidth of a playback signal from the optical disc;
    an Analog-to-Digital (AD) converter configured to convert an output signal from the analog filter into a multilevel digital signal;
    an adaptive equalizer configured to equalize a waveform of the multilevel digital signal based on a predetermined partial response class and to generate an equalized playback signal;
    a maximum likelihood detector configured to generate binary data corresponding to the recorded data recorded on the optical disc based on the equalized playback signal;
    an amplitude value extractor configured to obtain an amplitude value of a signal selected from an input signal to the adaptive equalizer and an output signal from the adaptive equalizer with respect to each binary data sequence output of a code length from the maximum likelihood detector; and
    an adjuster configured to adjust an amount of high-frequency amplification of the analog filter such that the amplitude value of the input signal to the adaptive equalizer of each binary data sequence of code length and the amplitude value of the output signal from the adaptive equalizer of each binary data sequence of code length satisfy a predetermined relationship,
    wherein the amplitude value extractor comprises:
    a delay module to which an input signal to the adaptive equalizer is input;
    a switch configured to switch between an output signal from the adaptive equalizer and an output signal from the delay module;
    a data storage module configured to delay and hold either the output signal from the adaptive equalizer or the output signal from the delay module switched by the switch on a clock of a unit length of the code length;
    a code length detector configured to detect the code length by detecting a data change point of the binary data;
    a selection signal generator configured to determine a response length of the partial response signal based on the partial response class and to generate a selection signal from the determined response length and the code length detected by the code length detector; and
    a selector configured to select an amplitude value of the equalized playback signal of a sampling point corresponding to the center of the detected code length from the data storage module based on the selection signal.

2. The optical disc device of claim 1, further comprising an average value calculator configured to calculate an average of two amplitude values of either a corresponding output signal from the adaptive equalizer or an output signal from the delay module when there are two sampling points.

3. The optical disc device of claim 1, wherein the adjuster comprises a module configured to adjust the high-frequency amplification amount of the analog filter in such a manner that amplitude values of signals of a plurality of code lengths satisfy a predetermined relationship.

4. The optical disc device of claim 2, wherein the adjuster comprises a module configured to adjust the high-frequency amplification amount of the analog filter in such a manner that amplitude values of signals of a plurality of code lengths satisfy a predetermined relationship.

5. The optical disc device of claim 1, wherein the adjuster is configured to adjust the high-frequency amplification amount of the analog filter in such a manner that a ratio between the amplitude value of the input signal to the adaptive equalizer and the amplitude value of the output signal from the adaptive equalizer becomes a predetermined value.

6. The optical disc device of claim 2, wherein the adjuster is configured to adjust the high-frequency amplification amount of the analog filter in such a manner that a ratio between the amplitude value of the input signal to the adaptive equalizer and the amplitude value of the output signal from the adaptive equalizer becomes a predetermined value.

7. An optical disc device configured to play an optical disc, comprising:
    an analog filter;
    an amplitude value extractor comprising:
        a delay module;
        a data storage module configured to delay and hold either the output signal from an adaptive equalizer or the output signal from the delay module;
        a code length detector configured to determine a code length; and
        a selector configured to select an amplitude value of an equalized playback signal based on the determined code length; and
    an adjuster configured to adjust the analog filter based on the amplitude value.

8. The optical disc device of claim 7, wherein adjusting the analog filter comprises adjusting a ratio of an input signal amplitude to an output signal amplitude to a predetermined value.

* * * * *